US012333193B2

(12) United States Patent
Sato

(10) Patent No.: US 12,333,193 B2
(45) Date of Patent: Jun. 17, 2025

(54) TERMINAL DEVICE, PROGRAM, AND PRINTING SYSTEM

(71) Applicant: Seiko Instruments Inc., Chiba (JP)

(72) Inventor: Yuta Sato, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 18/220,580

(22) Filed: Jul. 11, 2023

(65) Prior Publication Data

US 2024/0028269 A1 Jan. 25, 2024

(30) Foreign Application Priority Data

Jul. 20, 2022 (JP) .................................. 2022-115224

(51) Int. Cl.
*G06F 3/12* (2006.01)

(52) U.S. Cl.
CPC .......... *G06F 3/1205* (2013.01); *G06F 3/1242* (2013.01); *G06F 3/1257* (2013.01); *G06F 3/1285* (2013.01); *G06F 3/1293* (2013.01)

(58) Field of Classification Search
None
See application file for complete search history.

(56) References Cited

U.S. PATENT DOCUMENTS

| 6,384,921 B1* | 5/2002 | Saijo ...................... G06K 15/02 |
| | | 358/452 |
| 2002/0060805 A1* | 5/2002 | Tomita .................. G06F 3/1208 |
| | | 358/1.15 |
| 2008/0204819 A1* | 8/2008 | Chiba .................. H04N 1/3935 |
| | | 358/452 |
| 2010/0033749 A1* | 2/2010 | Iwauchi ............. H04N 1/32448 |
| | | 358/1.13 |
| 2014/0293310 A1* | 10/2014 | Nishizaka ............. G06F 3/1284 |
| | | 358/1.13 |
| 2019/0061338 A1* | 2/2019 | Scheele ................... B41F 27/14 |
| 2020/0057587 A1* | 2/2020 | Vellingiri ........... G06K 15/1885 |
| 2023/0011139 A1* | 1/2023 | Kosaka ................. G06F 3/1268 |
| 2023/0030221 A1* | 2/2023 | Ichikawa ............. G06F 3/1232 |

FOREIGN PATENT DOCUMENTS

JP H06-234248 A 8/1994

* cited by examiner

*Primary Examiner* — Helen Zong
(74) *Attorney, Agent, or Firm* — Crowell & Moring LLP

(57) ABSTRACT

A terminal which is included in a printing system including the terminal device and a printer separately or integrally, the terminal device includes an image generation determination unit configured to determine, when the printer used for printing has a page mode function, an approach for generating a print image for the printing such that use of the page mode function of the printer is given priority; and a command conversion unit configured to convert, when the image generation determination unit determines that the approach for generating the print image uses the page mode function of the printer, print target data to be printed into a command corresponding to the page mode function of the printer.

7 Claims, 6 Drawing Sheets

TERMINAL DEVICE, PROGRAM, AND PRINTING SYSTEM

RELATED APPLICATIONS

This application claims priority to Japanese Patent Application No. 2022-115224 filed on Jul. 20, 2022, the entire content of which is incorporated herein by reference.

BACKGROUND OF THE INVENTION

1. Field of the Invention

The present disclosure relates to a terminal device, a program, and a printing system.

2. Description of the Related Art

A printing system in which a printing instruction is transmitted from a terminal device to a printer, and the printer prints on a medium such as a receipt is known. As such a printing system, there are cases in which the terminal device and the printer are separate devices, and cases in which functions of the terminal device and functions of the printer are integrated.

The terminal device uses, for example, a dedicated application to instruct the printer to print.

In such a printing system, there can be a plurality of approaches for generating a print image to be used when printing is performed on a receipt, for example.

For example, the printing system may employ an approach in which the print image is generated on the printer side, an approach in which the print image is generated on the terminal device side, or an approach in which the function for generating the print image is included on both the printer side and the terminal device side and the user can select whether to use the function on the printer side or the function on the terminal device side.

Further, in such a printing system, there are cases in which a print image including a two-dimensional code such as a bar code is printed.

For example, in Japanese Patent Application Laid-open No. H06-234248, there is described a printer including a bar code generator which generates a bar code font corresponding to a designated bar code, and a control unit. The control unit analyzes a print command from a host device, and when it is recognized that the print command relates to bar code printing, extracts the bar code font corresponding to the designated bar code from the bar code generator and edits the print data.

However, in a printing system which has the function for generating the print image on both the printer side and the terminal device side, when a print image which includes a bar code is generated on the printer side in a mode (standard mode) in which print images are sequentially generated by transmitting commands from the terminal device to the printer, there have been the following problems.

Specifically, in the standard mode, depending on the combination of the printing mode of the printer and the print image, there are printing constraints such as, for example, the fact that characters cannot be arranged on the left and right sides of the bar code.

Further, a user who does not have the knowledge to correctly determine the requirements of such a printing constraint cannot select the appropriate printing mode.

The present disclosure has been made in consideration of such circumstances, and an object thereof is to provide a terminal device, a program, and a printing system with which a print image including a two-dimensional code can be appropriately printed.

SUMMARY OF THE INVENTION

According to one embodiment of the present invention, there is provided a terminal device, which is included in a printing system including the terminal device and a printer separately or integrally, the terminal device includes an image generation determination unit configured to determine, when the printer used for printing has a page mode function, an approach for generating a print image for the printing such that use of the page mode function of the printer is given priority; and a command conversion unit configured to convert, when the image generation determination unit determines that the approach for generating the print image uses the page mode function of the printer, print target data to be printed into a command corresponding to the page mode function of the printer.

In the above-mentioned terminal device according to the one embodiment of the present invention, the terminal device further including a storage unit configured to store content of a setting by a user relating to use of the page mode function of the printer, wherein the image generation determination unit is configured to determine the approach for generating the print image by giving priority to the content of the setting by the user.

In the above-mentioned terminal device according to the one embodiment of the present invention, wherein, when the print image in the approach for generating the print image by using the page mode function of the printer does not fit in a printable area of the printer, the image generation determination unit is configured to determine an approach for generating a print image having a reduced size from the print image in the terminal device as the approach for generating the print image.

In the above-mentioned terminal device according to the one embodiment of the present invention, wherein the approach for generating the print image includes an approach for generating the print image by using the page mode function of the printer, an approach for generating the print image by using a standard mode function of the printer, and an approach for generating the print image by using the page mode function of the terminal device.

In the above-mentioned terminal device according to the one embodiment of the present invention, wherein the terminal device is separate from the printer, and wherein the terminal device further comprises a communication unit configured to transmit the command converted by the command conversion unit to the printer.

According to one embodiment of the present invention, there is provided a program for causing a computer forming a terminal device included in a printing system including the terminal device and a printer separately or integrally to implement an image generation determination function for determining, when the printer used for printing has a page mode function, an approach for generating a print image for the printing such that use of the page mode function of the printer is given priority; and a command conversion function for converting, when the image generation determination function determines that the approach for generating the print image uses the page mode function of the printer, print target data to be printed into a command corresponding to the page mode function of the printer.

According to one embodiment of the present invention, there is provided a printing system including a terminal device and a printer separately or integrally, the terminal device including an image generation determination unit configured to determine, when the printer used for printing has a page mode function, an approach for generating a print image for the printing such that use of the page mode function of the printer is given priority; and a command conversion unit configured to convert, when the image generation determination unit determines that the approach for generating the print image uses the page mode function of the printer, print target data to be printed into a command corresponding to the page mode function of the printer.

DETAILED DESCRIPTION OF THE PREFERRED EMBODIMENTS

Figure 1:
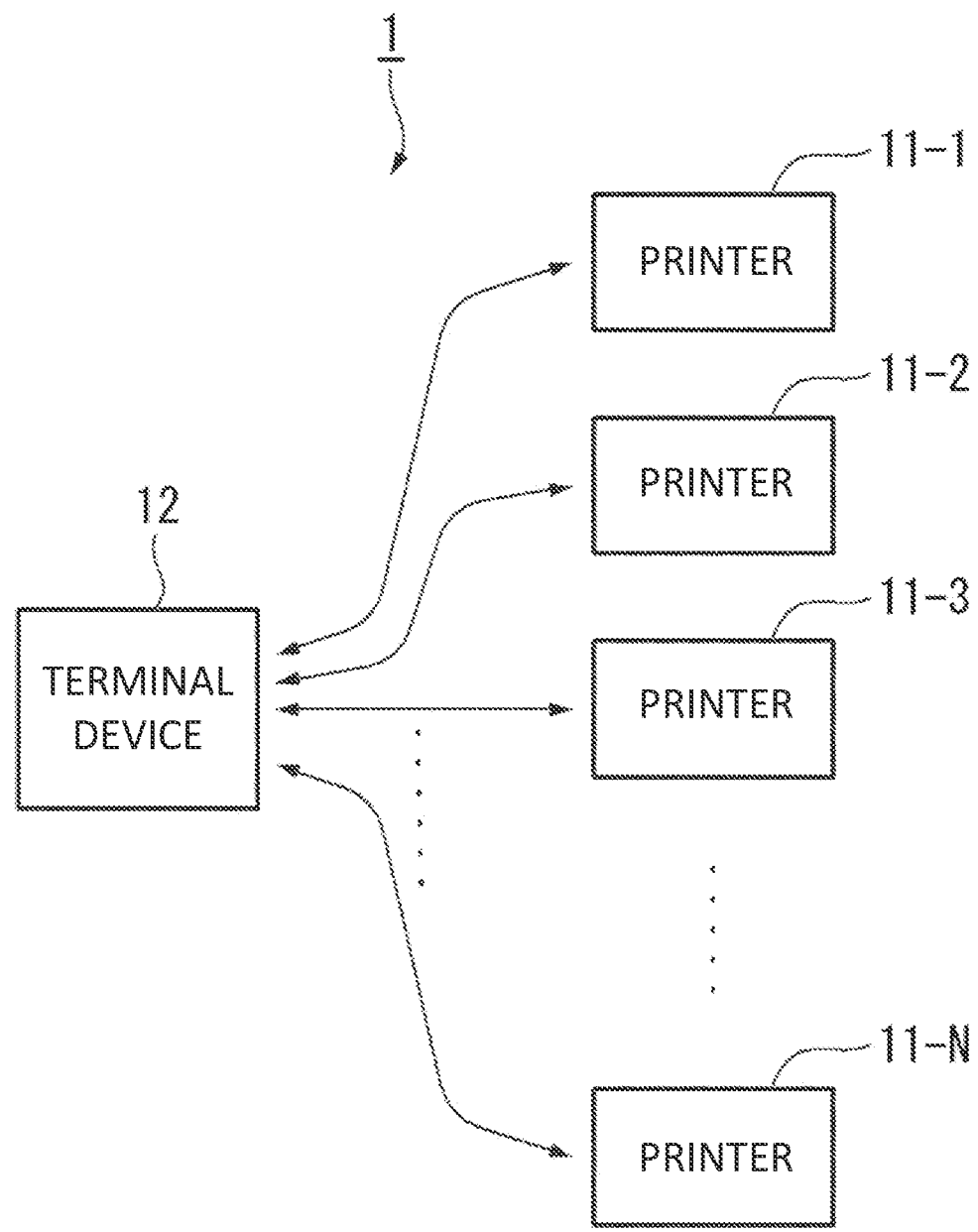
FIG. 1 is a diagram for illustrating an example of a configuration of a printing system according to at least one embodiment of the present disclosure.

Now, description is given of at least one embodiment of the present disclosure with reference to the drawings.
[Printing System]
FIG. 1 is a diagram for illustrating an example of a configuration of a printing system 1 according to at least one embodiment of the present disclosure.

The printing system 1 includes a plurality of N printers 11-1 to 11-N and one terminal device 12.

In the at least one embodiment, in order to simplify the description, one terminal device 12 is illustrated, but the printing system 1 may include a plurality of terminal devices.

The terminal device 12 is capable of performing communication to and from each of the printers 11-1 to 11-N.

The communication between the terminal device 12 and each of the printers 11-1 to 11-N may be, for example, wired communication, wireless communication, or communication including wired and wireless communication.

The terminal device 12 and each of the printers 11-1 to 11-N may, for example, be configured to communicate to and from each other only when required, or may be configured such that there is constantly a communication connection.
<Print Target>
In the at least one embodiment, a case in which printing of print target data including information on a bar code, which is an example of a two-dimensional code, is performed by the printers 11-1 to 11-N is described. In the at least one embodiment, a command corresponding to the print target data is transmitted from the terminal device 12 to the printers 11-1 to 11-N, and the printing of the print target data is performed by the printers 11-1 to 11-N.

That is, in the at least one embodiment, the printer (one of the printers 11-1 to 11-N) prints the print image including the bar code in response to a request (printing instruction) from the terminal device 12 which serves as the host.

As the two-dimensional code, for example, any code other than a bar code may be used.
<Printer>
Each of the plurality of printers 11-1 to 11-N may be installed at any location, for example, inside a shop such as a convenience store.

As a specific example, a part or all of the plurality of printers 11-1 to 11-N may be ticket issuing machines which print a print image including bar code information on a paper surface and output the resultant ticket.

Further, as a specific example, a part or all of the plurality of printers 11-1 to 11-N may be receipt issuing machines installed at a point of sale (POS) which print a print image including bar code information on a receipt (paper surface) and output the resultant receipt.

In the at least one embodiment, each of the printers 11-1 to 11-N is a thermal printer, but the printers 11-1 to 11-N are not limited to this, and various printers may be used.

The plurality of printers 11-1 to 11-N may be installed in the same facility (for example, a shop) in close proximity, or may be installed apart in different facilities.

Further, a part or all of the plurality of printers 11-1 to 11-N may be mobile-type printers that can be moved.

The bar code information may be any information, and may be, for example, information representing a uniform resource locator (URL) of a predetermined website for an advertisement or the like, information representing an individual or an entity like a company, or information representing a product.

The print target data which is used may include two or more bar code images in one print image (a set of print images).

In the at least one embodiment, each of the plurality of printers 11-1 to 11-N may differ in whether or not the plurality of printers 11-1 to 11-N have the function of a predetermined mode (in the at least one embodiment, for convenience of description, referred to as "page mode").

In the at least one embodiment, for convenience of the description, the plurality of printers 11-1 to 11-N are assumed to have the same configuration and operation except for the presence or absence of the page mode function.

However, as another example, other than the presence or absence of the page mode function, each of the plurality of printers 11-1 to 11-N may also differ in terms of their configuration and operation.

Figure 2:
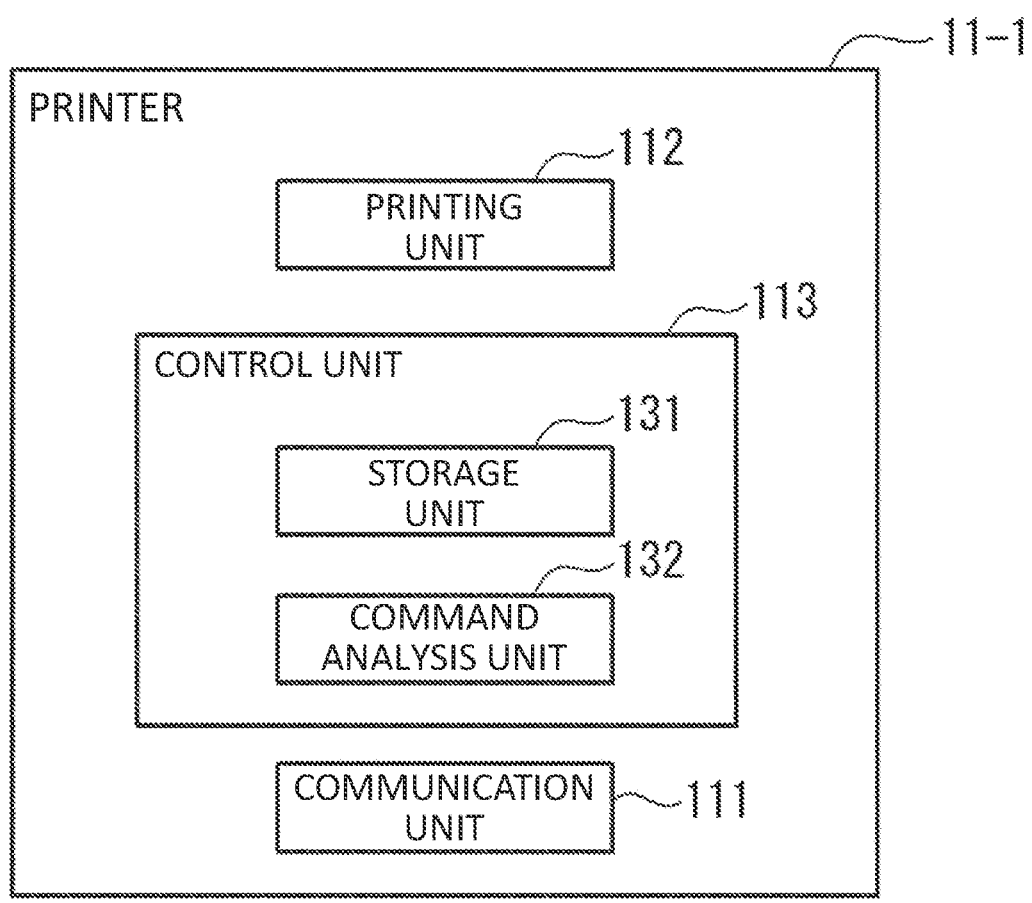
FIG. 2 is a diagram for illustrating an example of a configuration of a printer in the at least one embodiment.

FIG. 2 is a diagram for illustrating an example of the configuration of the printer 11-1 in the at least one embodiment.

For convenience of the description, the configuration and the operation of the printer 11-1 are described, but the configuration and the operation of each of the other printers 11-2 to 11-N are the same, except for the presence or absence of the page mode function.

The printer 11-1 includes a communication unit 111, a printing unit 112, and a control unit 113.

The control unit 113 includes a storage unit 131 and a command analysis unit 132.

It should be noted that the configuration example of the printer 11-1 illustrated in FIG. 2 is a schematic configuration example for illustrating the at least one embodiment, and various other configurations may be used.

The communication unit 111 has a function of performing communication to and from other devices. In the at least one embodiment, the communication unit 111 performs communication to and from the terminal device 12.

The printing unit 112 has a function of printing a print image based on print target data. In the at least one embodiment, the printing unit 112 prints the print image on a paper surface such as a receipt in accordance with an instruction from the control unit 113.

In the at least one embodiment, the printing unit 112 has a function of generating a bar code image.

The control unit 113 executes various types of control and processing in the printer 11-1.

The storage unit 131 stores various types of information (which may be referred to as "data").

The command analysis unit 132 analyzes the printing instruction command received from the terminal device 12.

The control unit 113 causes the printing unit 112 to print the print image based on the result of the analysis of the printing instruction command by the command analysis unit 132.

For example, the control unit 113 includes a processor such as a central processing unit (CPU), and performs various types of control and processing by using the processor to execute programs (control programs) stored in the storage unit 131.

<Printer Modes>

In the at least one embodiment, all of the printers 11-1 to 11-N have a normal mode function (referred to as "standard mode" in the at least one embodiment for convenience of description).

Further, in the at least one embodiment, some of the N printers 11-1 to 11-N have a page mode function, and the other printers (remaining printers) do not have the page mode function.

That is, in the at least one embodiment, some of the N printers 11-1 to 11-N have both the standard mode function and the page mode function, and the other printers (remaining printers) have the standard mode function but do not have the page mode function.

Further, in the at least one embodiment, all of the printers 11-1 to 11-N have a function of printing the data of the print image received from the terminal device 12 by using the printing unit 112.

This data is a print image having information in units of dots, and may be transmitted from the terminal device 12 to the printer 11-1.

<Terminal Device>

Figure 3:
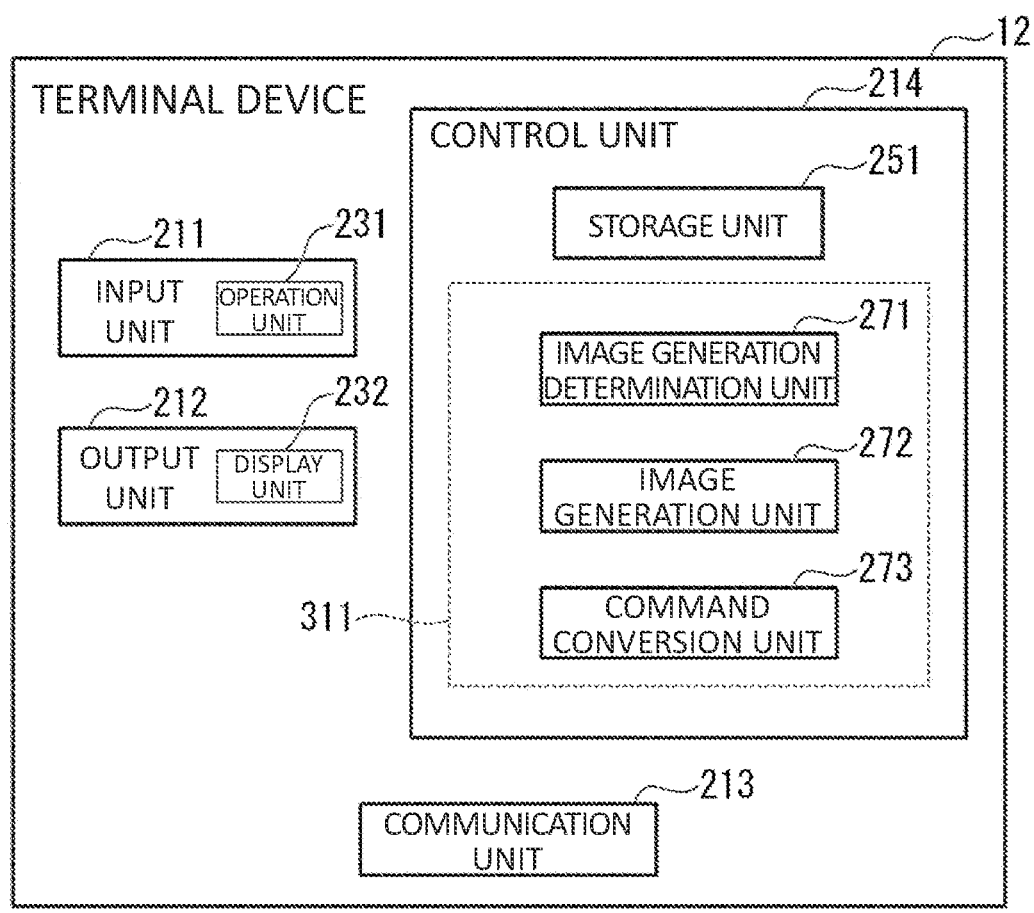
FIG. 3 is a diagram for illustrating an example of a configuration of a terminal device according to the at least one embodiment.

FIG. 3 is a diagram for illustrating an example of a configuration of the terminal device 12 according to the at least one embodiment.

The terminal device 12 is operated by a user (not shown).

The terminal device 12 may be, for example, a smartphone or another personal computer.

The terminal device 12 includes an input unit 211, an output unit 212, a communication unit 213, and a control unit 214.

The input unit 211 includes an operation unit 231 which can be operated by the user.

The output unit 212 includes a display unit 232 having a screen which displays information.

The control unit 214 includes a storage unit 251, an image generation determination unit 271, an image generation unit 272, and a command conversion unit 273.

In the at least one embodiment, the image generation determination unit 271, the image generation unit 272, and the command conversion unit 273 form a function unit (application function unit 311) implemented by a dedicated application, but the configuration of those units is not required to be limited to such a configuration.

It should be noted that the configuration example of the terminal device 12 illustrated in FIG. 3 is a schematic configuration example for illustrating the at least one embodiment, and various other configurations may be used.

The input unit 211 inputs information from the outside.

For example, the input unit 211 may input information corresponding to the details of an operation of the operation unit 231 performed by the user. The information may be a predetermined instruction.

The output unit 212 outputs information to the outside.

The output unit 212 may display and output the information to be displayed on a screen of the display unit 232, for example. As a result, for example, the user can view the information displayed and output on the screen.

The screen of the display unit 232 may have a touch panel function, and the touch panel function may be used as the operation unit 231.

The communication unit 213 has a function of performing communication to and from external devices. In the at least one embodiment, the communication unit 213 performs communication to and from each of the printers 11-1 to 11-N.

The control unit 214 executes various types of control and processing in the terminal device 12.

The storage unit 251 stores various types of information.

In the at least one embodiment, the data to be printed (print target data) is generated by the terminal device 12 or another device.

As an example, the terminal device 12 may have a function of performing a checkout of a product, for example, and generate print target data including information representing the results of the checkout, for example.

As another example, a server device (another device) other than the terminal device 12 may generate print target data and transmit the generated print target data to the terminal device 12. As a result, the terminal device 12 acquires the print target data.

The image generation determination unit 271 determines whether to use an approach in which processing for generating the print image is executed on the terminal device 12 side, or an approach in which processing for generating the print image is executed on the printer side (printer to which the printing instruction is transmitted).

When performing this determination, the image generation determination unit 271 may, for example, check the functions of the printer to which the printing instruction is transmitted.

Further, when performing this determination, in a case in which there is setting content relating to the approach set by the user, for example, the image generation determination unit 271 may check the content of the setting.

Specifically, the image generation determination unit 271 has a function of determining whether or not the print target data satisfies the requirements of the printing constraints, and by performing this determination, as a first stage of the determination processing, determines whether or not the print target data is to be printed in the standard mode.

As a result, when the image generation determination unit 271 determines that the print target data is to be printed in the standard mode, the image generation determination unit 271 transmits to the printer a command to print the print target data in the standard mode.

Meanwhile, when the image generation determination unit 271 determines that the print target data is not to be printed in the standard mode, the image generation determination unit 271 advances the processing to a second stage of the determination processing.

Any method may be used as the method of determining whether or not the print target data is to be printed in the standard mode, and it is not required to perform the determination based on whether or not it is possible to print the print target data in the standard mode.

For example, when determining whether or not the print target data is to be printed in the standard mode, the image generation determination unit 271 may check the content of the print target data.

As a specific example, the image generation determination unit 271 may determine whether or not the print target data includes a bar code, and when it is determined that the print target data does not include a bar code, selects the standard mode. Meanwhile, when it is determined that the print target data includes a bar code, the image generation determination unit 271 does not select the standard mode.

The image generation determination unit 271 may be capable of selecting the standard mode even when the print target data includes a bar code. As a specific example, when the print target data includes a bar code, the image generation determination unit 271 may determine whether or not the approach using the standard mode is sufficient. In this case, when it is determined that the approach using the standard mode is sufficient, the image generation determination unit 271 may select the standard mode, and not select the standard mode when it is determined that the approach using the standard mode is not sufficient.

In the second stage of the determination processing, the image generation determination unit 271 determines whether the printer to which the printing instruction is transmitted has the page mode function (that is, whether the relevant printer supports the page mode).

As a result, when the image generation determination unit 271 determines that the printer has the page mode function, the image generation determination unit 271 determines that the page mode function of the printer is to be used, and controls such that the processing for generating the print image is performed on the printer side.

Meanwhile, when the image generation determination unit 271 determines that the printer does not have the page mode function, the image generation determination unit 271 determines that the page mode function of the terminal device 12 is to be used, and controls such that the processing for generating the print image is performed on the terminal device 12 side (in the at least one embodiment, by the image generation unit 272).

Further, the image generation determination unit 271 can be set such that the print image is always generated on the terminal device 12 side (in the at least one embodiment, by the image generation unit 272) based on, for example, an operation of the operation unit 231 by the user. When such a setting is performed, the print image is always generated on the terminal device 12 side (in the at least one embodiment, by the image generation unit 272).

Such a setting is intended for users who, for example, are capable of determining the requirements of the printing constraints and do not want the printing mode to be changed depending on the situation. For example, even for the same print target data, there are situations in which the print result (the appearance of the printed matter) may change depending on whether the processing for generating the print image is performed on the terminal device 12 side or on the printer side. Thus, based on the above-mentioned setting, the user can prevent such a situation.

Thus, in the printing system 1 according to the at least one embodiment, the appropriate printing mode can be used even in cases in which it is not suitable to print the print target data in the standard mode.

Further, in the printing system 1 according to the at least one embodiment, when the user has performed a setting such that the processing for generating the print image is always performed on the terminal device 12 side, the appropriate printing mode can be used based on the content of the setting by the user.

In the at least one embodiment, for example, there are two printing modes that can be selected by the user, namely, a printing mode which gives priority to dot printing (dot printing using the page mode function of the terminal device 12) and a printing mode which gives priority to printing in which the print image is generated on the printer side. However, the present disclosure is not limited to those examples.

In the at least one embodiment, the user can set a printing mode priority in accordance with the wishes of the user.

Further, for example, such printing mode priority may be set in common for all printing, or may be set for each predetermined unit, such as for each printing unit.

In addition, for example, such printing mode priority may be set in advance, or may be set (a new setting or a change to the setting after being set) at any timing.

When the user selects a printing mode which gives priority to dot printing, the image generation determination unit 271 controls such that the print image is generated on the terminal device 12 side.

Meanwhile, when the user selects a printing mode which gives priority to printing in which the print image is generated on the printer side, the image generation determination unit 271 determines (confirms) whether or not the printer to which the printing instruction is transmitted has the page mode function.

When the printer has the page mode function, the image generation determination unit 271 controls such that the print image is generated on the printer side.

When the printer does not have the page mode function, the image generation determination unit 271 controls such that the print image is generated on the terminal device 12 side.

Further, as the printing mode that can be selected by the user, a printing mode in which the print image is always generated on the terminal device 12 side may be provided for users who do not want the printing mode to be changed depending on the situation (for example, users who are capable of determining the requirements of the printing constraints).

It should be noted that such a printing mode is not required to be used.

Regarding the processing for generating the print image on the terminal device 12 side, for example, the terminal device 12 may have a function for reducing (or increasing) the size of the print image so that the print image fits in a printable area of the printer to which the printing instruction is transmitted.

This function may be included in the control unit 214 (for example, the image generation unit 272).

The reduction (or increase) in size of the print image may be performed, for example, on the entire print image, or may be performed on a part of the image included in the print image.

In the terminal device 12, the method of determining whether each of the printers 11-1 to 11-N has the page mode function is not particularly limited, and any method may be used.

As an example, a method may be used in which the control unit 214 (for example, the image generation determination unit 271) transmits a predetermined command asking the determination target printer (in the at least one embodiment, one of the printers 11-1 to 11-N) whether the printer has the page mode function, receives a response command from the printer in response to the command, and determines whether or not the printer has the page mode function based on the content of the response.

In this case, the printer has a function of transmitting (sending back) the response command to the terminal device 12 when the predetermined command is received from the terminal device 12. The response command includes information representing whether or not the printer has the page mode function.

As an example, a method may be used in which the control unit 214 (for example, the image generation determination unit 271) analyzes a command received from the determination target printer (in the at least one embodiment, one of the printers 11-1 to 11-N) when communicating to and from the printer, and determines whether or not the printer has the page mode function based on the analysis result.

As an example, a method may be used in which the control unit 214 (for example, the image generation determination unit 271) determines whether the determination target printer (in the at least one embodiment, one of the printers 11-1 to 11-N) has a predetermined storage device, and determines whether or not the printer has the page mode function based on the determination result.

In this case, it is assumed that printers having the page mode function include the predetermined storage device, and printers not having the page mode function do not include the predetermined storage device.

The predetermined storage device may be, for example, a random-access memory (RAM) required for implementing the page mode function.

As an example, a method may be used in which the control unit 214 (for example, the image generation determination unit 271) stores in advance information (for example, a table) which associates identification information (ID) on each printer with information representing the presence or absence of the page mode, and determines whether or not each printer has the page mode function based on the contents of the table.

In this case, the control unit 214 (for example, the image generation determination unit 271) has a function of identifying the identification information on the printer based on information received from the determination target printer (in the at least one embodiment, one of the printers 11-1 to 11-N).

Any information may be used as the identification information. For example, device information unique to each printer, or identification information assigned to each printer may be used.

The information on the contents of the table may be stored in the storage unit 251, for example.

As an example, a method may be used in which the control unit 214 (for example, the image generation determination unit 271) stores in advance information (for example, a table) which associates information representing a model of each printer with information representing the presence or absence of the page mode, and determines whether or not each printer has the page mode function based on the contents of the table.

In this case, the control unit 214 (for example, the image generation determination unit 271) has a function of identifying the model of the printer based on information received from the determination target printer (in the at least one embodiment, one of the printers 11-1 to 11-N).

The information on the contents of the table may be stored in the storage unit 251, for example.

As an example, a method may be used in which the control unit 214 (for example, the image generation determination unit 271) stores in advance, in each of one or more of the printers to which the printing instruction is transmitted (in the at least one embodiment, one or more of the printers 11-1 to 11-N), information representing whether the printer has the page mode function, and determines whether or not each printer has the page mode function based on that information.

The information may be stored in the storage unit 251, for example.

Thus, in the terminal device 12, for example, the determination regarding whether or not each of the printers 11-1 to 11-N has the page mode function may be performed by communicating to and from each of the printers 11-1 to 11-N when required, or whether or not each printer 11-1 to 11-N has the page mode function may be stored in advance.

The image generation unit 272 has the page mode function.

In the case of using an approach in which the processing for generating the print image is executed by the terminal device 12, the image generation unit 272 generates the print image by using the page mode function.

The command conversion unit 273 generates a command for instructing the printer to which the printing instruction is transmitted to perform printing.

For example, when the processing for generating the print image is performed on the printer side, the command conversion unit 273 converts the print target data into a command for generating the print image based on the print target data by the printer.

Further, for example, when the processing for generating the print image is performed on the terminal device 12 side, the command conversion unit 273 converts the print image into a command for printing by the printer.

For example, the control unit 214 includes a processor such as a CPU, and executes various types of control and processing by the processor executing programs (control programs) stored in the storage unit 251.

<Standard Mode>

Description is now given of the standard mode.

The standard mode is a mode in which printing is performed in the order of commands.

The standard mode is suitable when printing is performed in irregular lengths, such as receipts.

Figure 4:
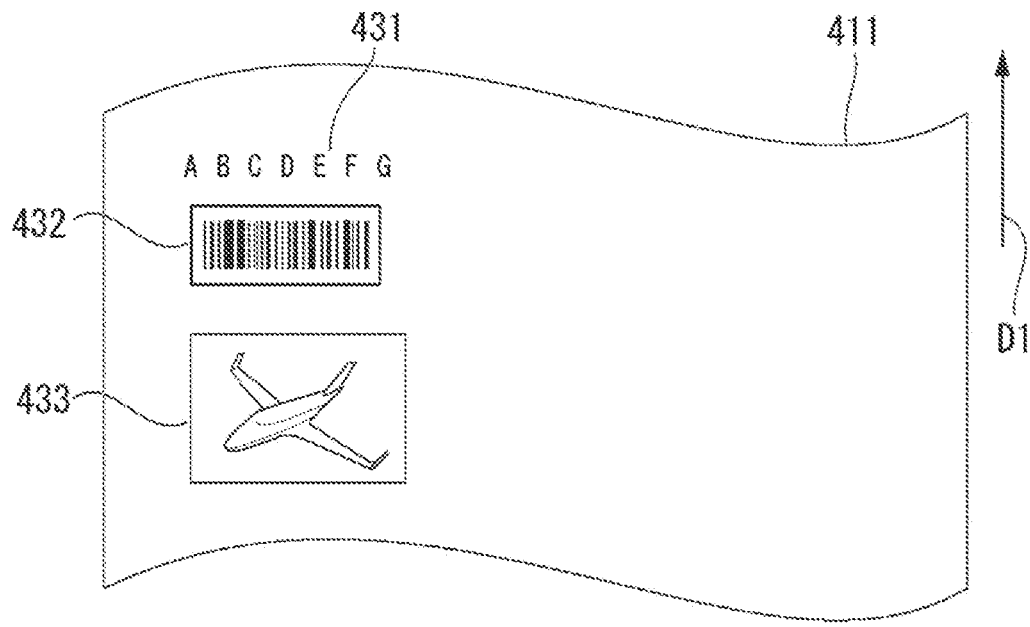
FIG. 4 is a diagram for illustrating an example of a printed matter in a standard mode in the at least one embodiment.

FIG. 4 is a diagram for illustrating an example of a printed matter 411 in the standard mode in the at least one embodiment.

In the example of FIG. 4, a part of the paper surface is illustrated as the printed matter 411.

The printed matter 411 is conveyed along a paper feeding direction D1 illustrated in FIG. 4.

Examples of print commands include (Procedure 1) to transmit text data, (Procedure 2) to command printing of bar code, and (Procedure 3) to transmit designated file (to designate an image file).

Text data printing, bar code printing, and image file printing are performed based on such print commands.

In the example of FIG. 4, a text portion 431 in which text data is printed, a bar code portion 432 in which a bar code is printed, and an image portion 433 in which image file data (image data) is printed are formed on the paper surface of the printed matter 411.

In the example of FIG. 4, a case in which one print image (a set of print images) includes a print image portion of text data, a print image portion of a bar code, and a print image portion of an image file is illustrated, but the present disclosure is not required to be limited to this. For example, for each print target, one print image (only) of those print image portions may be used, or a print image including two of those print image portions may be used.

<Page Mode>

Description is now given of the page mode.

The page mode is a mode in which printing is performed for each page.

In the page mode, first, a page mode print area is secured, and the printing data (each image portion) is developed at given positions in the secured print area. Then, the developed printing data is printed in accordance with the page mode print commands.

The page mode is suitable, for example, when printing is performed in fixed lengths. Further, the page mode is suitable for printing in which, for example, it is required to designate coordinates for the beginning of a text or the print positions of ruled lines.

Figure 5:
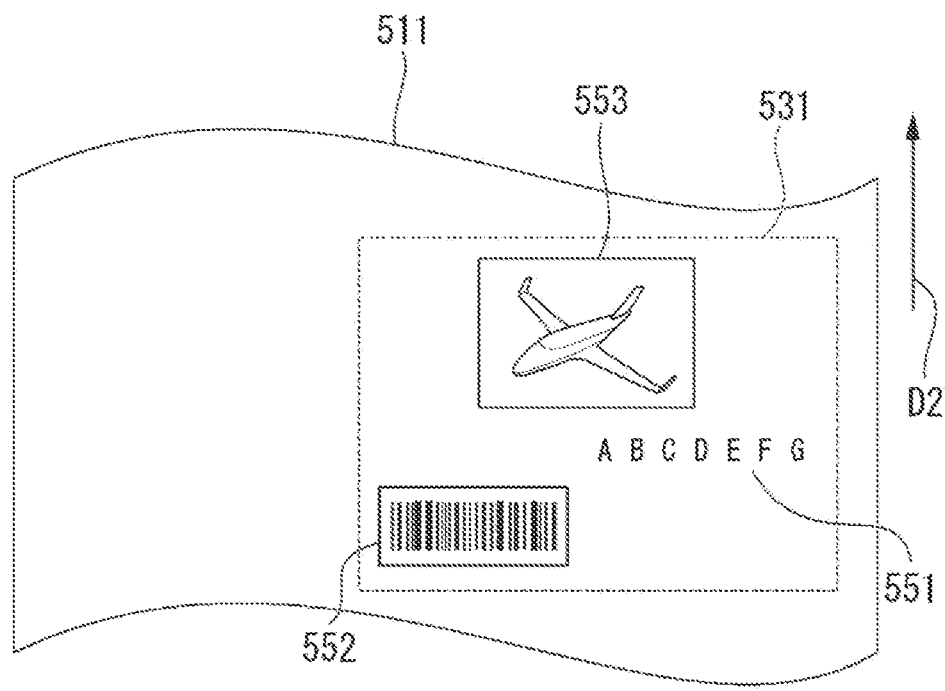
FIG. 5 is a diagram for illustrating an example of a printed matter in a page mode in the at least one embodiment.

FIG. 5 is a diagram for illustrating an example of a printed matter 511 in the page mode in the at least one embodiment.

In the example of FIG. 5, a part of the paper surface is illustrated as the printed matter 511.

The printed matter 511 is conveyed along a paper feeding direction D2 illustrated in FIG. 5.

Examples of print commands include (Procedure 1) to start page mode, (Procedure 2) to designate print area (printing area) in the page mode, (Procedure 3) to transmit text data in the page mode, (Procedure 4) to command printing of a bar code in the page mode, (Procedure 5) to transmit a designated file in the page mode (designate an image file), (Procedure 6) to print in the page mode, and (Procedure 7) to end the page mode.

In (Procedure 6) to print in the page mode, the processing of printing the data in (Procedure 3) to (Procedure 5) in the print area designated in (Procedure 2) is performed.

In the printing in the page mode, each print image portion forming one print image (a set of print images) is arranged at a predetermined location of the print area.

In the example of FIG. 5, on the paper surface of a printed matter 511, a print area 531 (printing area) is designated, and a text portion 551 in which text data is printed, and a bar code portion 552 in which a bar code is printed, and an image portion 553 in which image file data (image data) is printed are formed.

Thus, in the page mode, each piece of developed data (for example, text print data, bar code print data, and image file print data) can be arranged and printed in the designated print area.

In the example of FIG. 5, a case in which one print image (a set of print images) includes a print image portion of text data, a print image portion of a bar code, and a print image portion of an image file is illustrated, but the present disclosure is not required to be limited to this. For example, for each print target, one print image (only) of those print image portions may be used, or any two of those print image portions may be used.

<Standard Mode and Page Mode>

In the at least one embodiment, when the standard mode function of the printers 11-1 to 11-N is used and when the page mode function of the printers 11-1 to 11-N is used, in both cases, a predetermined command is transmitted from the terminal device 12 to the printers 11-1 to 11-N, and a print image is generated based on the command on the printer 11-1 to 11-N side. Further, when the print image includes a bar code, a print image of the bar code is generated on the printer 11-1 to 11-N side.

The command in the standard mode and the command in the page mode may be partially or wholly different.

With the page mode function, it is possible to arrange the bar code and characters, for example, relatively more freely than with the standard mode function. Meanwhile, with the standard mode function, images are generated in the order of commands, and thus the arrangement is less flexible than with the page mode function.

With the page mode function, for example, it is also possible to arrange the print image in coordinate units, designate the print area (for example, designate top, bottom, left, and right margins), and rotate and arrange the bar code by 90 degrees.

<Example of Processing Procedure>

Figure 6:
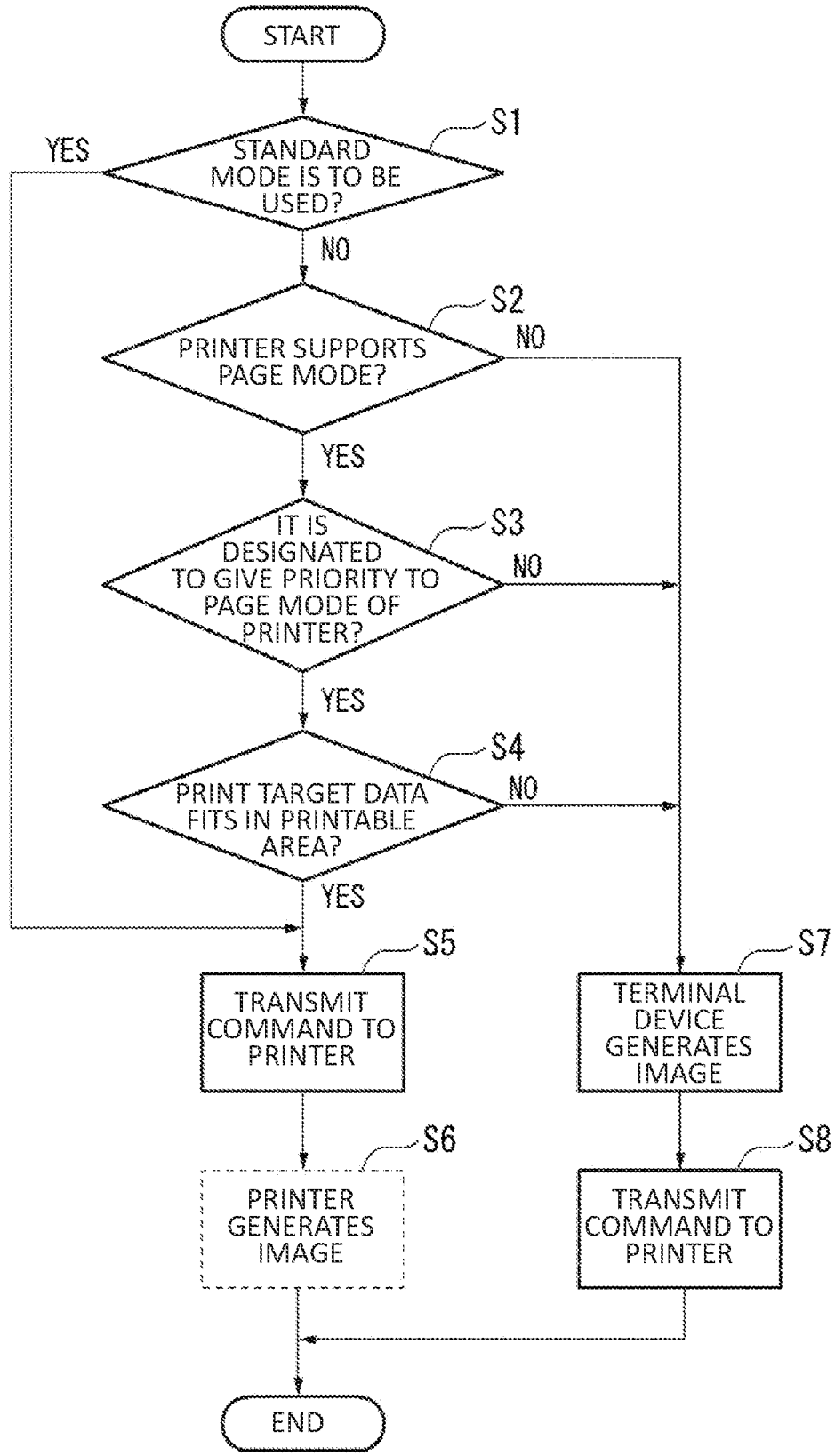
FIG. 6 is a flowchart for illustrating an example of processing performed in the printing system according to the at least one embodiment.

FIG. 6 is a flowchart for illustrating an example of processing performed in the printing system 1 according to the at least one embodiment.

In the example of FIG. 6, the terminal device 12 can use three different printing modes.

The first printing mode is a printing mode which uses the standard mode function of the printers 11-1 to 11-N. In the first printing mode, the print image is generated on the printer 11-1 to 11-N side by using the standard mode function.

The second printing mode is a printing mode which uses the page mode function of the printers 11-1 to 11-N. In the second printing mode, the print image is generated on the printer 11-1 to 11-N side by using the page mode function.

The third printing mode is a printing mode which uses the page mode function of the terminal device 12. In the third printing mode, the print image is generated on the terminal device 12 side by using the page mode function.

In this example, in order to simplify the description, a case in which the print target data is generated in the terminal device 12, and the printer to be used to print the print target data (in the at least one embodiment, any one of the printers 11-1 to 11-N) is uniquely determined is taken as an example.

As another example, the terminal device 12 may variably determine the printer to be used for printing the print target data in accordance with a predetermined rule each time print target data is generated.

As another example, the terminal device 12 may variably determine the printer to be used for printing the print target data in accordance with an instruction from the user each time print target data is generated.

(Step S1)

In the terminal device 12, when print target data is generated, the image generation determination unit 271 determines whether or not the standard mode is to be used.

As a result of this determination, in the terminal device 12, when it is determined that the standard mode is to be used ("Yes" in Step S1), the process proceeds to Step S5.

Meanwhile, as a result of this determination, in the terminal device 12, when it is determined that the standard mode is not to be used ("No" in Step S1), the process proceeds to Step S2.

(Step S2)

In the terminal device 12, the image generation determination unit 271 determines whether or not the printer to be used for printing supports the page mode.

As a result of this determination, in the terminal device 12, when it is determined that the printer to be used for printing supports the page mode ("Yes" in Step S2), the process proceeds to Step S3.

Meanwhile, as a result of this determination, in the terminal device 12, when it is determined that the printer to be used for printing does not support the page mode ("No" in Step S2), the process proceeds to Step S7.

(Step S3)

In the terminal device 12, the image generation determination unit 271 determines whether or not it is designated to give priority to the page mode of the printer. This designation is performed by the user, for example.

As a result of this determination, in the terminal device 12, when it is determined that it is designated to give priority to the page mode of the printer ("Yes" in Step S3), the process proceeds to Step S4.

Meanwhile, in this determination, in the terminal device 12, when it is determined that it is not designated to give priority to the page mode of the printer ("No" in Step S3), the process proceeds to Step S7.

(Step S4)

In the terminal device 12, the image generation determination unit 271 determines whether or not the print target data fits in the printable area (the printable area in the page mode of the printer to be used for printing).

As a result of this determination, in the terminal device 12, when it is determined that the print target data fits in the printable area ("Yes" in Step S4), the process proceeds to Step S5.

Meanwhile, as a result of this determination, in the terminal device 12, when it is determined that the print target data does not fit in the printable area ("No" in Step S4), the process proceeds to Step S7.

(Step S5)

In the terminal device 12, the command conversion unit 273 converts the print target data into a printing instruction command, and the command is transmitted to the printer to be used for printing via the communication unit 213.

Then, in the printing system 1, the process proceeds to Step S6.

(Step S6)

In the printer which has received the printing instruction command from the terminal device 12, a print image is generated based on the received command and printing of the print image is executed.

Then, the printing system 1 ends the processing of this flow.

In the processing step of Step S5, the terminal device 12 directly transmits the command to the printer without executing processing for generating the print image. Further, in the processing step of Step S6, the printer generates a print image (for example, a print image including a bar code).

Further, in the at least one embodiment, in the processing step of Step S6, the printer uses any one of the standard mode function or the page mode function in accordance with the received command.

In the example of FIG. 6, in the processing step of Step S5 and the processing step of Step S6, in the case in which the process proceeds from Step S1 to Step S5, printing processing corresponding to the standard mode is performed, that is, printing processing in a first printing mode (printing mode which uses the standard mode function of the printer) is performed.

Further, in the processing step of Step S5 and the processing step of Step S6, in the case in which the process proceeds from Step S4 to Step S5, printing processing corresponding to the page mode of the printer is performed, that is, printing processing in a second printing mode (printing mode which uses the page mode function of the printer) is performed.

(Step S7)

The terminal device 12 generates the print image based on the print target data by using the page mode function of the terminal device 12.

Then, in the printing system 1, the process proceeds to Step S8.

(Step S8)

In the terminal device 12, the command conversion unit 273 converts the print image (for example, dot data) to be printed into a printing instruction command, and transmits the command representing the print image to the printer used for printing. As a result, the printer which has received the command prints the print image based on the received command.

Then, the printing system 1 ends the processing of this flow.

In the processing step of Step S7, the terminal device 12 generates a print image (for example, a print image including a bar code), and in the processing step of Step S8, the terminal device 12 transmits to the printer a command for printing the print image generated by the terminal device 12 itself.

Further, in the case in which the process proceeds from Step S4 to Step S7, in the processing step of Step S7, the terminal device 12 performs processing for reducing the size of the image of the print target data so that the print image fits in the printable area of the printer.

In the processing step of Step S7 and the processing step of Step S8, printing processing corresponding to the page mode of the terminal device 12 is performed, that is, printing processing in a third printing mode (printing mode which uses the page mode function of the terminal device 12) is performed.

In the example of FIG. 6, a case in which the size of the image can be reduced at the terminal device 12 is illustrated, but as another example, a configuration in which the size of the image can be increased at the terminal device 12 may be used, or a configuration in which the size of the image can be reduced and increased at the terminal device 12 may be used.

The order of the processing steps in the flow illustrated in FIG. 6 is an example for description, and the processing may be performed in another order.

For example, the order of the processing steps of Step S2 and Step S3 may be switched.

Further, for example, the order of the processing steps of Step S2, Step S3, and Step S4 may be switched.

In the flow illustrated in FIG. 6, a case in which the processing step of Step S3 is performed is illustrated, but as another example, a configuration in which the processing step of Step S3 is not performed may be used. In this case, in the example of FIG. 6, for example, in the case of "Yes" in Step S2, the process proceeds to Step S4.

Further, in the flow illustrated in FIG. 6, a case in which the processing step of Step S4 is performed is illustrated, but as another example, a configuration in which the processing step of Step S4 is not performed may be used. In this case, in the example of FIG. 6, for example, in the case of "Yes" in Step S3, the process proceeds to Step S5.

Further, in the flow illustrated in FIG. 6, a configuration in which the processing step of Step S3 and the processing step of Step S4 are not performed may be used. In this case, in the example of FIG. 6, for example, in the case of "Yes" in Step S2, the process proceeds to Step S5.

<About the at Least One Embodiment Described Above>

As described above, the printing system 1 according to the at least one embodiment can appropriately print a print image including a two-dimensional code.

With the printing system 1 according to the at least one embodiment, for example, an application developer can build the following system.

Specifically, it is possible to build a printing system 1 in which the terminal device 12 can determine, based on the printing mode functions (and print pattern content) the designated printer has, whether to perform processing for generating a print image including a bar code by using a function on the printer side or a function on the terminal device 12 side.

With the printing system 1 according to the at least one embodiment, it is possible to achieve the best bar code printing environment while making full use of the functions the printer has. For example, it is possible to avoid as much as possible a situation in which a printing format breaks down or a bar code cannot be printed.

In the printing system 1 according to the at least one embodiment, for example, it is possible for a print image to be analyzed on the terminal device 12 side, and to output the optimum printing instruction for a print image including a bar code to the printer.

In the printing system 1 according to the at least one embodiment, for example, it is possible to dynamically switch control while prioritizing the best function of the printer when a bar code is printed, thereby enabling control that does not affect the print result.

Further, with the printing system 1 according to the at least one embodiment, for example, it is possible for the user to designate a priority mode (in the at least one embodiment, the priority of the printing mode to be used) when print target data having a bar code is printed.

Modification Example

Figure 7:
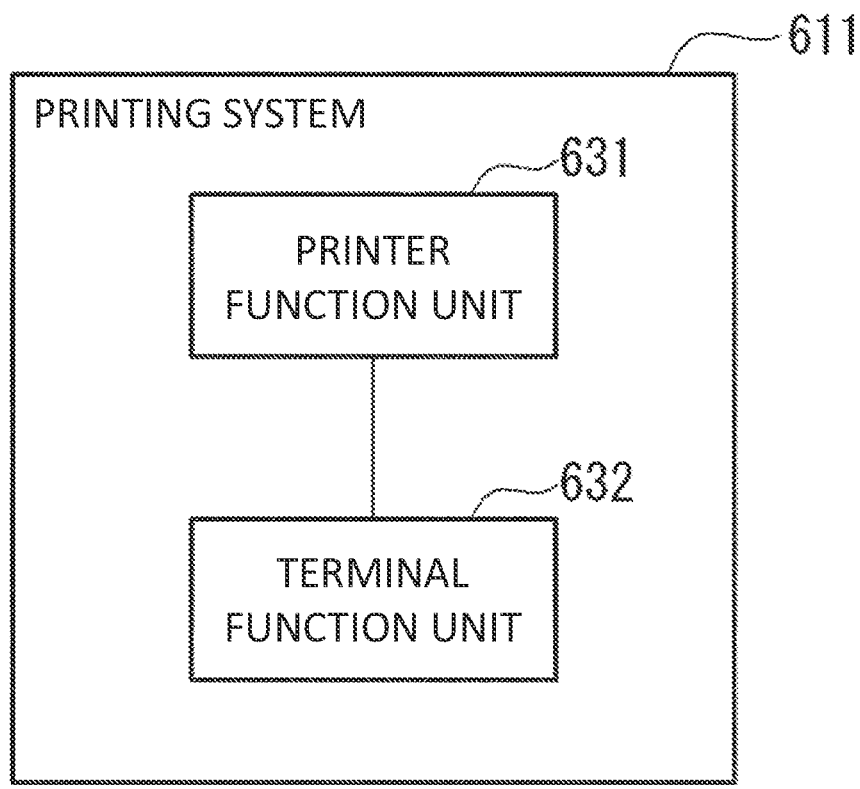
FIG. 7 is a diagram for illustrating an example of a configuration of a printing system according to a modification example of the at least one embodiment.

FIG. 7 is a diagram for illustrating an example of a configuration of a printing system 611 according to a modification example of the at least one embodiment of the present disclosure.

The printing system 611 includes a printer function unit 631 which has the function of a printer, and a terminal function unit 632 which has the function of a terminal device.

Here, for convenience of the description, those units are referred to as "printer function unit 631" and "terminal function unit 632," but those units may also be referred to as "printer" and "terminal device," respectively, for example.

In the modification example, the printer function unit 631 has roughly the same configuration and performs roughly the same operations as the printer 11-1 illustrated in FIG. 2.

In the modification example, the terminal function unit 632 has roughly the same configuration and performs roughly the same operations as the terminal device 12 illustrated in FIG. 3.

Thus, a system (in the modification example, printing system 611) in which the function of the printer and the function of the terminal device are integrated may be used.

In the modification example, such a system is referred to as "printing system 611," but the system may be referred to by any other name, such as a terminal-integrated printer or a printer-integrated terminal device.

Further, in a system in which the functions of a printer and the functions of a terminal device are integrated, it is not always required to provide the function units illustrated in FIG. 2 and the function units illustrated in FIG. 3 as they are. For example, when the functions are integrated, some of the function units may be omitted or changed, and other function units may be added.

<Regarding Modification Example of the at Least One Embodiment>

As described above, like the printing system 1 illustrated in FIG. 1, the printing system 611 according to the modification example of the at least one embodiment can appropriately print a print image including a two-dimensional code.

In the printing system 611 according to the modification example, for example, even when one of the printer function unit 631 and the terminal function unit 632 is replaced due to malfunctioning, the terminal function unit 632 can select the appropriate printing mode.

Thus, the technology of the at least one embodiment is useful even when the terminal function unit 632 and the printer function unit 631 are fixed on a one-to-one basis.

A program for implementing the function of any component of any device (for example, terminal device, printer, or the like) described above may be recorded in a computer-readable recording medium so that the program is read by a computer system to be executed. In this case, the "computer system" includes an operating system or hardware including peripheral devices. Further, the "computer-readable recording medium" includes a portable medium such as a flexible disk, a magneto-optical disk, a ROM, or a compact disc (CD)-read only memory (ROM), and a storage device such as a hard disk drive built in the computer system. Further, the "computer-readable recording medium" includes a recording medium that holds a program for a given period of time, such as a volatile memory provided in the computer system serving as a server or a client when a program is transmitted via a network such as the Internet or a communication line such as a telephone line. The volatile memory may be, for example, a random access memory (RAM). The recording medium may be, for example, a non-transitory recording medium.

The above-mentioned program may be transmitted from the computer system in which the program is stored in, for example, the storage device, to another computer system via a transmission medium or through a transmission wave in a transmission medium. In this case, the "transmission medium" through which a program is transmitted corresponds to a medium having a function of transmitting information, for example, a network such as the Internet or a communication line such as a telephone line.

Further, the above-mentioned program may be intended to implement a part of the functions described above. Further, the above-mentioned program may enable the functions described above to be implemented when being combined with a program that is already recorded in a computer system, and may be what is called a differential file. The differential file may be called "differential program."

Further, the function of any component of any device (for example, terminal device, printer, or the like) described above may be implemented by a processor. For example, each processing step in the at least one embodiment may be implemented by a processor which operates based on information such as a program and a computer-readable recording medium which stores information such as the program. The processor may implement, for example, the function of each unit by separate hardware or by integrated hardware. For example, the processor may include hardware, and such hardware may include at least one of a circuit which processes digital signals or a circuit which processes analog signals. For example, the processor may be configured by using one or both of one or a plurality of circuit devices and one or a plurality of circuit elements mounted on a circuit board. An integrated circuit (IC), for example, may be used as the circuit device(s), and a resistor or a capacitor, for example, may be used as the circuit element(s).

The processor may be, for example, a CPU. However, the processor is not limited to a CPU, and various types of processors, for example, a graphics processing unit (GPU) or a digital signal processor (DSP), may be used. Further, the processor may be, for example, a hardware circuit based on an application specific integrated circuit (ASIC). In addition, the processor may be configured by, for example, a plurality of CPUs, or may be configured by a plurality of ASIC hardware circuits. Moreover, the processor may be configured by, for example, a combination of a plurality of CPUs and a plurality of ASIC hardware circuits. The processor may also include, for example, one or more components out of amplifier circuits, filter circuits, and the like for processing analog signals.

The at least one embodiment of the present disclosure has been described above in detail with reference to the accompanying drawings. However, specific configurations of the present disclosure are not limited to the at least one embodiment and encompass design modifications and the like without departing from the gist of the present disclosure.

What is claimed is:

1. A terminal device, which is included in a printing system including the terminal device and a printer separately or integrally, the terminal device comprising:
    an image generation determination unit configured to determine, when the printer used for printing has a page mode function, an approach for generating a print image for the printing such that use of the page mode function of the printer is given priority, wherein in response to print target data to be printed including a bar code, the image generation determination unit is configured to determine to use the page mode function of the printer; and
    a command conversion unit configured to convert, when the image generation determination unit determines that the approach for generating the print image uses the page mode function of the printer, the print target data into a command corresponding to the page mode function of the printer, the print target data corresponding to a plurality of independent print image portions, the command further comprising print area information designating a print area for printing the plurality of independent print image portions, and the page mode function of the printer securing a print area on a paper surface based on the print area information, arranging each of the plurality of print image portions at a different predetermined location of the secured print area, and printing, in accordance with the command, the plurality of print image portions in the secured print area on the paper surface.

2. The terminal device according to claim 1, further comprising a storage unit configured to store content of a setting by a user relating to use of the page mode function of the printer,
    wherein the image generation determination unit is configured to determine the approach for generating the print image by giving priority to the content of the setting by the user.

3. The terminal device according to claim 1, wherein, when the print image in the approach for generating the print image by using the page mode function of the printer does not fit in a printable area of the printer, the image generation determination unit is configured to determine an approach for generating a print image having a reduced size from the print image in the terminal device as the approach for generating the print image.

4. The terminal device according to claim 1, wherein the approach for generating the print image includes an approach for generating the print image by using the page mode function of the printer, an approach for generating the print image by using a standard mode function of the printer, and an approach for generating the print image by using the page mode function of the terminal device.

5. The terminal device according to claim 1,
    wherein the terminal device is separate from the printer, and
    wherein the terminal device further comprises a communication unit configured to transmit the command converted by the command conversion unit to the printer.

6. A program for causing a computer forming a terminal device included in a printing system including the terminal device and a printer separately or integrally to implement:
    an image generation determination function for determining, when the printer used for printing has a page mode function, an approach for generating a print image for the printing such that use of the page mode function of the printer is given priority, wherein in response to print target data to be printed including a bar code, the image generation determination function determines to use the page mode function of the printer; and
    a command conversion function for converting, when the image generation determination function determines that the approach for generating the print image uses the page mode function of the printer, the print target data to be printed into a command corresponding to the page mode function of the printer, the print target data corresponding to a plurality of independent print image portions, the command further comprising print area information designating a print area for printing the plurality of independent print image portions, and the page mode function of the printer securing a print area on a paper surface based on the print area information, arranging each of the plurality of print image portions at a different predetermined location of the secured print area, and printing, in accordance with the command, the plurality of print image portions in the secured print area on the paper surface.

7. A printing system, comprising a terminal device and a printer separately or integrally,
    the terminal device including:
    an image generation determination unit configured to determine, when the printer used for printing has a page mode function, an approach for generating a print image for the printing such that use of the page mode function of the printer is given priority, wherein in response to print target data to be printed including a bar code, the image generation determination unit determines to use the page mode function of the printer; and a command conversion unit configured to convert, when the image generation determination unit determines that the approach for generating the print image uses the page mode function of the printer, the print target data into a command corresponding to the page mode function of the printer, the print target data corresponding to a plurality of independent print image portions, the command further comprising print area information designating a print area for printing the plurality of independent print image portions, and the page mode function of the printer securing a print area on a paper surface based on the print area information, arranging each of the plurality of print image portions at a different predetermined location of the secured print area, and printing, in accordance with the command, the plurality of print image portions in the secured print area on the paper surface.

* * * * *